(12) United States Patent
Schroeder et al.

(10) Patent No.: US 11,104,204 B2
(45) Date of Patent: Aug. 31, 2021

(54) METHOD FOR OPERATING A COOLANT CIRCUIT FOR A VEHICLE AIR-CONDITIONING SYSTEM

(71) Applicant: AUDI AG, Ingolstadt (DE)

(72) Inventors: Dirk Schroeder, Manching (DE); Christian Rebinger, Munich (DE); Helmut Rottenkolber, Mindelstetten (DE); Jan Wack, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 178 days.

(21) Appl. No.: 16/493,061

(22) PCT Filed: Mar. 1, 2018

(86) PCT No.: PCT/EP2018/055083
§ 371 (c)(1),
(2) Date: Sep. 11, 2019

(87) PCT Pub. No.: WO2018/166810
PCT Pub. Date: Sep. 20, 2018

(65) Prior Publication Data
US 2020/0130468 A1  Apr. 30, 2020

(30) Foreign Application Priority Data
Mar. 13, 2017 (DE) .................. 10 2017 204 122.6

(51) Int. Cl.
| | |
|---|---|
| *B60H 1/22* | (2006.01) |
| *B60H 1/32* | (2006.01) |
| *B60H 1/00* | (2006.01) |

(52) U.S. Cl.
CPC ..... *B60H 1/00899* (2013.01); *B60H 1/00007* (2013.01); *B60H 1/0045* (2013.01);
(Continued)

(58) Field of Classification Search
CPC .... B60H 1/00428; B60H 1/0045; B60H 1/22; B60H 1/00899; B60H 1/3208;
(Continued)

(56) References Cited

U.S. PATENT DOCUMENTS

| | | | | |
|---|---|---|---|---|
| 5,074,123 A | * | 12/1991 | Iida ...................... | B60H 1/3216 62/228.5 |
| 6,487,869 B1 | * | 12/2002 | Sulc ...................... | B60H 1/3205 62/228.4 |

(Continued)

FOREIGN PATENT DOCUMENTS

| | | |
|---|---|---|
| CN | 101539355 A | 9/2009 |
| CN | 104272033 A | 1/2015 |

(Continued)

OTHER PUBLICATIONS

English translation of International Preliminary Search Report on Patentability dated Sep. 26, 2019 in corresponding International Application No. PCT/EP2018/055083; 8 pages.

(Continued)

*Primary Examiner* — Nelson J Nieves
(74) *Attorney, Agent, or Firm* — Maier & Maier, PLLC (57) ABSTRACT

A method for operating a cooling circuit. It is provided that a) the actuation signal ST of the coolant compressor is provided so as to increase over time from a minimum value ($ST_{min}$) in order to generate a start-up phase of the coolant compressor, b) a control signal maximum value ($ST_{max}$) and a control signal threshold ($ST_{SW}$) are provided, where $ST_{SW} < ST_{max}$, c) the actuation signal (ST) is limited to the control signal maximum value ($ST_{max}$) if the actuation signal (ST) reaches the control signal threshold ($ST_{SW}$) and the measured high and/or low-pressure value (PHD, $P_{ND}$) satisfies a condition.

7 Claims, 4 Drawing Sheets

(52) U.S. Cl.
CPC ........... *B60H 1/00428* (2013.01); *B60H 1/22* (2013.01); *B60H 1/3208* (2013.01); *B60H 1/3222* (2013.01); *B60H 2001/3238* (2013.01); *F25B 2500/26* (2013.01); *F25B 2600/01* (2013.01); *F25B 2700/1931* (2013.01)

(58) Field of Classification Search
CPC .......... B60H 1/3222; B60H 2001/3238; F25B 2500/26; F25B 2600/01; F25B 2700/1931
See application file for complete search history.

(56) References Cited

U.S. PATENT DOCUMENTS

| | | | | |
|---|---|---|---|---|
| 7,207,784 | B2* | 4/2007 | Sato | B60H 1/3222 417/222.1 |
| 2004/0065100 | A1* | 4/2004 | Jacobsen | B60H 1/3232 62/228.1 |
| 2006/0204368 | A1 | 9/2006 | Imai et al. | |
| 2006/0236708 | A1* | 10/2006 | Mizuno | F25B 49/005 62/228.3 |
| 2007/0253839 | A1* | 11/2007 | Higashihara | B60H 1/3216 417/317 |
| 2020/0031202 | A1* | 1/2020 | Jung | B60H 1/3216 |

FOREIGN PATENT DOCUMENTS

| | | | | |
|---|---|---|---|---|
| CN | 104344502 | A | 2/2015 | |
| CN | 105757888 | A | 7/2016 | |
| CN | 106016798 | A | 10/2016 | |
| DE | 3706152 | A1 | 9/1988 | |
| DE | 19935731 | A1 | 2/2001 | |
| EP | 3040633 | A1 | 7/2016 | |
| JP | 01278831 | A | * 11/1989 | ........... B60H 1/3208 |
| JP | H08-128765 | A | 5/1996 | |
| JP | 2000-105033 | A | 4/2000 | |
| JP | 2004-162979 | A | 6/2004 | |
| JP | 2014-156946 | A | 8/2014 | |
| JP | 5579290 | B1 | 8/2014 | |

OTHER PUBLICATIONS

Chinese Office Action dated Oct. 10, 2020, in connection with corresponding CN Application No. 201880018302.8 (11 pp., including machine-generated English translation).

German Examination Report dated Dec. 11, 2017 in corresponding German Application No. 10 2017 204 122.6; 20 pages.

International Search Report with English translation and Written Opinion with machine translation dated Jun. 20, 2018 in corresponding International Application No. PCT/EP2018/055083; 17 pages.

* cited by examiner

METHOD FOR OPERATING A COOLANT CIRCUIT FOR A VEHICLE AIR-CONDITIONING SYSTEM

FIELD

A method for operating a cooling circuit for a vehicle air-conditioning system and a vehicle air-conditioning system with a cooling circuit for carrying out the method.

A vehicle air-conditioning system with a cooling circuit for implementing a refrigeration system operation with a heat pump function can be equipped, as a function of the vehicle drive design, with a mechanical or electrical coolant compressor.

BACKGROUND

A mechanical coolant compressor is driven via a belt drive connected to the traction motor of the vehicle and controlled in terms of differential pressure, mass flow or suction pressure by means of a control current put out via a control unit to a compressor control valve designed as proportional valve of the coolant compressor. An electrical coolant compressor comprises an internal electric motor as drive, so that a control of the rotational speed is enabled. In addition, it is also possible to use mechanical compressors via an electrically driven belt drive which can be uncoupled from the motor.

For the start-up of the refrigeration system or of the heat pump operation, mechanical coolant compressors as a rule are actuated with a control current signal as actuation signal via the compressor control valve, wherein the control current corresponds to a corresponding suction pressure or corresponds to a coolant mass flow. In electrical compressors, as actuation signal, a rotational speed signal is generated directly, in order to set a corresponding coolant mass flow via this rotational speed signal. Such electrical compressors are used in piston (of axial or radial design), vane or spiral (scroll) designs in electric vehicles.

As control variable for the closed loop control of a coolant compressor of a cooling circuit, as a rule, the air temperature at the outlet of the coolant evaporator or a coolant pressure acquired on the low-pressure or high-pressure side in the cooling circuit is used. The last-mentioned case occurs particularly if safety pressure limits in the cooling circuit are exceeded with regard to the high pressure. In addition, the situation in which operating pressure limits (for example, of the low pressure) are undershot can occur; they should be evaluated as less critical, but should nevertheless be avoided. If, in such a closed loop control, there is a control deviation of large extent between a target and an actual value of the control variable, which usually occurs in the start-up phase of the coolant compressor, the actuation signal is raised until the control deviation reaches a minimum. In the case of a positive deviation, that is to say if the actual value is greater than the target value, the actuation signal is reduced. A negative deviation, that is to say when the actual value is less than the target value, leads to a raising of the actuation signal. If, due to a defective behavior or a defect in the start-up phase, a compressor briefly fails to react or reacts contrary to the output actuation signal, for example, due to an internal leakage, the control deviation remains high. Therefore, the actuation signal is increased continuously to a maximum value. If this leads spontaneously to the conveying of coolant, because the compressor starts to convey, for example, due to a spontaneous sealing between the two scroll elements (stationary and orbiting) or due to the overcoming of an adhesive friction on a swash plate, pressure peaks result, which can occur abruptly and exceed the permissible system limits of the cooling circuit. Ideally, the closed loop control should be designed so as to adjust the maximum permissible high pressure or to damp the pressure pulse by a switching off of the compressor and subsequent new start-up. It is not ruled out that the permissible limits can be exceeded due to high pressure gradients and that discharge valves or burst disks can respond as a result. In the worst case, damage to components can be expected.

From DE 199 35 731 A1, a method for operating a vehicle refrigeration system operated subcritically or transcritically is known. In order for the coolant mass flow and the high pressure to increase immediately to a desired value during a start-up of the vehicle refrigeration system, it is proposed that, during the start-up phase, the coolant mass flow is immediately set to a need-appropriate value and the coolant pressure is set in accordance with at least one predetermined characteristic variable, wherein safety pressure limits are predetermined, and, if they are exceeded, the vehicle refrigeration system is controlled. Thus it is proposed, for example, to limit the coolant mass flow through the coolant compressor to a predetermined value during the start-up phase of the coolant compressor at high outside temperatures and/or at high coolant resting pressures. Alternatively, in the case of high outside temperatures and/or high coolant resting pressures, it is proposed to limit the compressor drive capacity to a predetermined value.

However, the disadvantage of this method is that an unsuccessful start of a coolant compressor, due to internal leakage, for example, cannot be detected. The behavior of a coolant compressor is referred to as an unsuccessful start if, when a control signal is output by a control device to the compressor, that is to say to the electric drive or to the control valve, with belt rotating, no pressure buildup can be measured, i.e., no increase of the high pressure or decrease of the low pressure occurs, the resting pressure level is maintained, which in turn means that no conveyance of coolant within the refrigeration system occurs.

Moreover, from DE 37 06 152 A, a method for controlling a vehicle air-conditioning system with a refrigeration circuit is known, by means of which the refrigeration capacity is optimized, and the respective function of the units influencing the mode of operation of the air-conditioning system is taken into consideration. For this purpose, it is proposed to acquire the compressor capacity of a coolant compressor, the condenser capacity of a coolant condenser, and the evaporator capacity of an evaporator, and to supply these variables as electrical variables to a control device. These input variables are linked, and output signals are generated as a function of at least two of these input variables taking into consideration the parameters for the refrigeration power requirement, output signals which are supplied to controllable adjustment means so as to influence the compressor capacity, the condenser capacity and/or the evaporator capacity. For further optimization of the power requirement, the compressor capacity can be influenced, in that the geometric conveyance volume is varied by a direct change in stroke or by controlling the time of closure of the compression chamber, or the filling degree is controlled by a variable output throttling, or the rotational speed of the compressor is controlled.

In this known method as well, it is disadvantageous that an unsuccessful start of a coolant compressor cannot be detected.

SUMMARY

An aim of the disclosure is to indicate a method of the type mentioned at the beginning, by means of which pressure peaks in the cooling circuit and thus an uncontrolled pressure buildup in the system of the vehicle air-conditioning system in a start-up phase of the coolant compressor is largely and reliably prevented. It should be possible to diagnose already at an early time that a defective behavior is present. Another aim is to indicate a vehicle air-conditioning system with a cooling circuit optionally with heat pump function for carrying out this method.

According to this solution, such a method for operating a cooling circuit for a vehicle air-conditioning system with
- a coolant compressor which can be controlled by means of an actuation signal ST for controlling the compressor capacity,
- a condenser or gas cooler,
- an evaporator with associated expansion device, and
- at least one pressure sensor means for measuring the coolant pressure on the high-pressure and/or low-pressure side of the cooling circuit, is characterized according to the invention in that a) the actuation signal ST of the coolant compressor is provided so as to increase over time from a minimum value $ST_{min}$ in order to generate a start-up phase of the coolant compressor, b) a control signal maximum value $ST_{max}$ and a control signal threshold $ST_{SW}$ are provided, where $ST_{SW} < ST_{max}$, c) the actuation signal ST is limited to the control signal maximum value $ST_{max}$ if the actuation signal ST reaches the control signal threshold $ST_{SW}$ and the measured high- and/or low-pressure pressure value satisfies or satisfy one of the following conditions:

(I) the high-pressure value is less than a high-pressure threshold $S_{P\_HD}$, (II) the low-pressure value is greater than a low-pressure threshold $S_{P\_ND}$, and/or (III) the difference between high-pressure value and low-pressure value is less than a differential pressure threshold $S_{\Delta P}$, and d) after the expiration of a defined duration, the start-up phase of the coolant compressor is terminated if the measured high-pressure value and/or the measured low-pressure value still satisfy or satisfies one of the conditions (I) to (III).

According to this method according to the disclosure, the start-up behavior of the coolant compressor is monitored exclusively on the basis of the high pressure in the cooling circuit, or exclusively on the basis of the low pressure in the cooling circuit, or on the basis of the high pressure and the low pressure in the cooling circuit. If, during the actuation of the coolant compressor, the actuation signal ST increases to the control signal threshold $ST_{SW}$, and if at the same time, during this start-up phase, at least one of the conditions I to III is satisfied, the actuation signal ST is limited to the control signal maximum value $ST_{max}$, and the coolant compressor continues to be operated under these boundary conditions. If, after a defined duration has expired, these boundary conditions do not change, i.e., if at least one of the conditions I to III is still satisfied, the start-up phase of the coolant compressor is terminated. The coolant compressor can be switched off permanently, or a new start-up can be initiated as another start-up phase. If such a new start-up leads to the same result, the coolant compressor remains switched off. The number of new start-up attempts for the compressor per driving cycle can be fixed at a certain number (for example, 5). If no regular operation sets in, then a defect message directed to the driver can be generated, and, at the same time, a derating process of different vehicle systems that can impact the development of the battery temperature particularly adversely can be initiated, in order to continue to enable a use of the vehicle within the permissible component temperature limits.

If the start-up behavior of the coolant compressor is monitored only on the basis of the high pressure in the cooling circuit, only the condition I needs to be verified. If this high pressure during the increasing actuation signal ST does not increase to the control signal threshold $ST_{SW}$, that is to say if it remains less than the high-pressure threshold $S_{P\_HD}$, the control signal ST is limited to the control signal maximum value $ST_{max}$. The condition (I) naturally also includes the condition that the high-pressure value $P_{HD}$ remains nearly unchanged, that is to say remains at the same value during the defined duration.

If the start-up behavior of the coolant compressor is monitored only on the basis of the low pressure in the cooling circuit, only the condition II needs to be verified. If this low pressure during the increasing actuation signal ST does not decrease to the low-pressure threshold $S_{P\_ND}$, that is to say if it remains greater than the low-pressure threshold $S_{P\_ND}$, the actuation signal ST is limited to the control signal maximum value $ST_{max}$.

Naturally, this condition (II) also includes the condition that the low-pressure value $P_{ND}$ remains nearly unchanged, that is to say remains at the same value during the defined duration.

If the start-up behavior of the coolant compressor is monitored both on the basis of the high pressure and also on the basis of the low pressure in the cooling circuit, at least the condition III needs to be verified. If the difference between the high pressure and the low pressure during the increasing actuation signal ST does not increase to the control signal threshold $ST_{SW}$, that is to say if it remains less than the differential pressure threshold $S_{\Delta P}$, the actuation signal ST is limited to the control signal maximum value $ST_{max}$.

Naturally, the condition (III) also includes the condition that the difference between high-pressure value $P_{HD}$ and low-pressure value $P_{ND}$ remains at the value or near zero.

During the monitoring both of the high pressure and also of the low pressure, the condition I or II or the two conditions I and II can in addition be used for monitoring the start-up behavior of the coolant compressor.

In summary, the method according to the disclosure, for the system start of the cooling circuit of the vehicle air-conditioning system, a control signal ST is generated, which, starting from the minimum value $ST_{min}$, as start value, is increased continuously under at least one of the conditions I, II and/or III to a control signal maximum value $ST_{max}$ if the actuation signal ST reaches the control signal threshold $ST_{SW}$, and at least one of the conditions I, II and/or III is still satisfied even after expiration of the defined duration.

At least for the system start, an exaggeratedly high rotational speed of, for example, 1500 rpm, as start impulse, is necessary in order to ensure a start-up of the coolant compressor. After a successful compressor start-up, its operating rotational speed is then set, which can correspond, for example, to the minimum value $ST_{min}$, of 800 rpm as minimum rotational speed value.

By this method according to the disclosure, a general diagnosis of the coolant compressor, but in particular a diagnosis of its start-up and operating behavior, is implemented, and, at the same time, pressure peaks within the cooling circuit, which can be attributed to a component malfunction, are prevented. Thus, an effective component protection and an effective component securing are ensured, and unnecessary refilling and component exchange and component maintenance operations are avoided.

According to an advantageous embodiment of the disclosure, it is provided that:

e) the coolant compressor is designed with diagnosis means, by means of which at least one capacity variable of the coolant compressor is generated, and, instead of the method steps c and d, the following method steps are carried out:

c1) the actuation signal ST is limited to the control signal maximum value $ST_{max}$ if the actuation signal ST reaches the control signal threshold $ST_{SW}$, the capacity variable is less than a defined capacity threshold $S_L$, and the measured high- and/or low-pressure value satisfy or satisfies one of the following conditions:

(I) the high-pressure value is less than a high-pressure threshold $S_{P\_HD}$, (II) the low-pressure value is greater than a low-pressure threshold $S_{P\_ND}$, or (III) the difference between high-pressure value and low-pressure value is less than a differential pressure threshold $S_{\Delta P}$, and d1) after expiration of a defined duration, the start-up phase of the coolant compressor is terminated if the measured high-pressure value and/or the measured low-pressure value still satisfy or satisfies one of the conditions I to III as before, and the capacity variable is less than the capacity threshold $S_L$.

In this development of the method according to the disclosure, the cooling circuit comprises a coolant compressor which is itself capable of self-diagnosis and which, as electrical coolant compressor, generates a diagnosis signal which outputs and indicates, for example, the torque or the consumed power or the resulting drive capacity as a capacity variable. This capacity variable is used additionally for the evaluation of the start-up behavior of the coolant compressor. If, in addition to the condition I, II or III, no increase of the capacity variable above the capacity threshold $S_L$ is detected on the basis of the diagnosis signals of the coolant compressor, the method proceeds in accordance with the method steps c1 and d1.

If the predetermined thresholds are exceeded in the method according to the disclosure or in the development thereof, this is interpreted as operational start-up of the coolant compressor. This means that the pressures in the cooling circuit as well as the diagnosis signals of a coolant compressor which is itself capable of self-diagnosis behave as expected during the start-up. In this case, the start-up phase of the coolant compressor ends, and the control parameter is unrestricted, so that the coolant compressor can be operated with the operational closed loop control.

According to another advantageous development of the disclosure, the control signal maximum value $ST_{max}$ is determined as a function of the extent of a control deviation between a target value of a control variable controlling the cooling circuit and the actual value thereof. A large control deviation in this case means that a high load is applied to the cooling circuit.

Advantageously, the coolant compressor is designed as an electrical coolant compressor with an electric motor, wherein, as control signal, a rotational speed signal for the electric motor is used. Furthermore, the coolant compressor can also be designed as mechanical coolant compressor with a proportional valve, wherein, as control signal, a control current signal for the proportional valve is used.

The method according to the disclosure can also be used in a cooling circuit with a heat pump function.

The method according to the disclosure is suitable for use in a vehicle air-conditioning system with a cooling circuit which, in addition to a cooling operation (refrigeration system function), can also be operated in a heating operation (heat pump function).

BRIEF DESCRIPTION OF THE DRAWINGS

Below, the invention is explained in greater detail on the basis of embodiment examples in reference to the appended figures.

DETAILED DESCRIPTION

Figure 1:
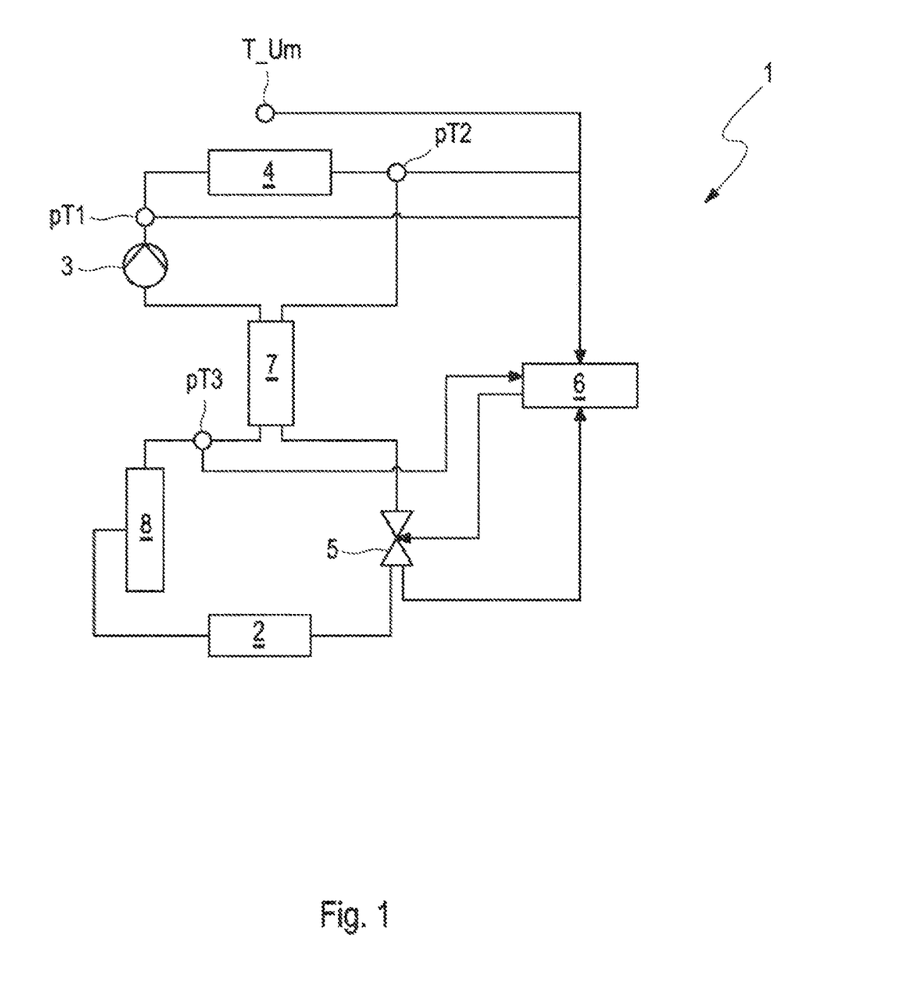
FIG. 1 shows a circuit diagram of a vehicle refrigeration system for carrying out the method according to the invention.

FIG. 1 shows a cooling circuit 1 of a vehicle air-conditioning system which is formed by an evaporator 2, a coolant compressor 3, a coolant condenser or gas cooler 4, an expansion device 5 upstream of the evaporator 2 in flow direction of the coolant, for example an R744 coolant, an inner heat exchanger 7, and a coolant collector 8.

The closed loop control of the cooling circuit 1 occurs by means of a control device 6 as a function of parameters which are supplied to the control device 6 as input variables. As input variables, pressure and temperature values of pressure-temperature sensors pT1, pT2 and pT3 are acquired inter alia, wherein alternatively pure pressure sensors can also be used. The pressure-temperature sensor pT1 is arranged on the high-pressure side in flow direction of the coolant after the compressor 3, the pressure-temperature sensor pT2 is arranged in flow direction of the coolant after the condenser or gas cooler 4, and the pressure-temperature sensor pT3 is arranged in flow direction of the coolant after the coolant collector 8 in the cooling circuit 1. The pressure-temperature sensor pT1 acquires the high pressure and the hot gas temperature directly at the outlet of the compressor, the pressure-temperature sensor pT2 acquires the high pressure and the coolant temperature at the outlet of the condenser or gas cooler 4 for the implementation of a closed loop control of the optimal high pressure or of the supercooling of the coolant at the outlet of the condenser or gas cooler 4, and the pressure-temperature sensor pT3 acquires the low pressure of the cooling circuit 1. The environmental temperature is acquired by means of a temperature sensor T_Um and also supplied to the control device 6.

When a coolant collector is used as low-pressure storage, it has been found to be advantageous to incorporate the pressure sensor pT3 directly after the coolant collector 8 in the pipe run, since a detection of underfilling can be implemented directly here. However, as a rule, it is conventional and state-of-the-art that the sensors pT1 and pT2 are built in directly in the inlet or outlet region of the coolant compressor 3 or in the inlet or outlet region of the condenser or gas cooler 4.

In the refrigeration system operation of the cooling circuit 1, the coolant compressed by the coolant compressor 3 is supplied to the coolant condenser 4 or gas cooler 4 arranged in the front region of the vehicle, where the coolant is condensed or cooled, before it is expanded by means of the expansion device 5 into the evaporator 2 after passage through the inner heat exchanger 7. A fresh air, environmental air or partial environmental air flow supplied to the evaporator 2 is cooled by same and supplied as incoming flow to the passenger compartment of the vehicle. The coolant evaporated in the evaporator 2 is supplied in turn to the compressor 3 on the low-pressure side via the coolant collector 8 and the inner heat exchanger 7.

The coolant compressor 3 of the cooling circuit 1 is designed either as mechanical coolant compressor or as electrical coolant compressor. A mechanical coolant compressor is driven via a belt drive connected to the traction motor of the vehicle and controlled in terms of differential pressure, mass flow and suction pressure by means of a control current via a compressor control valve of the coolant compressor. An electrical coolant compressor comprises an internal electric motor as drive, so that a control of the rotational speed is enabled. In addition, it is also possible to use mechanical compressors via an electrically driven belt drive which can be uncoupled from the motor.

Figure 2:
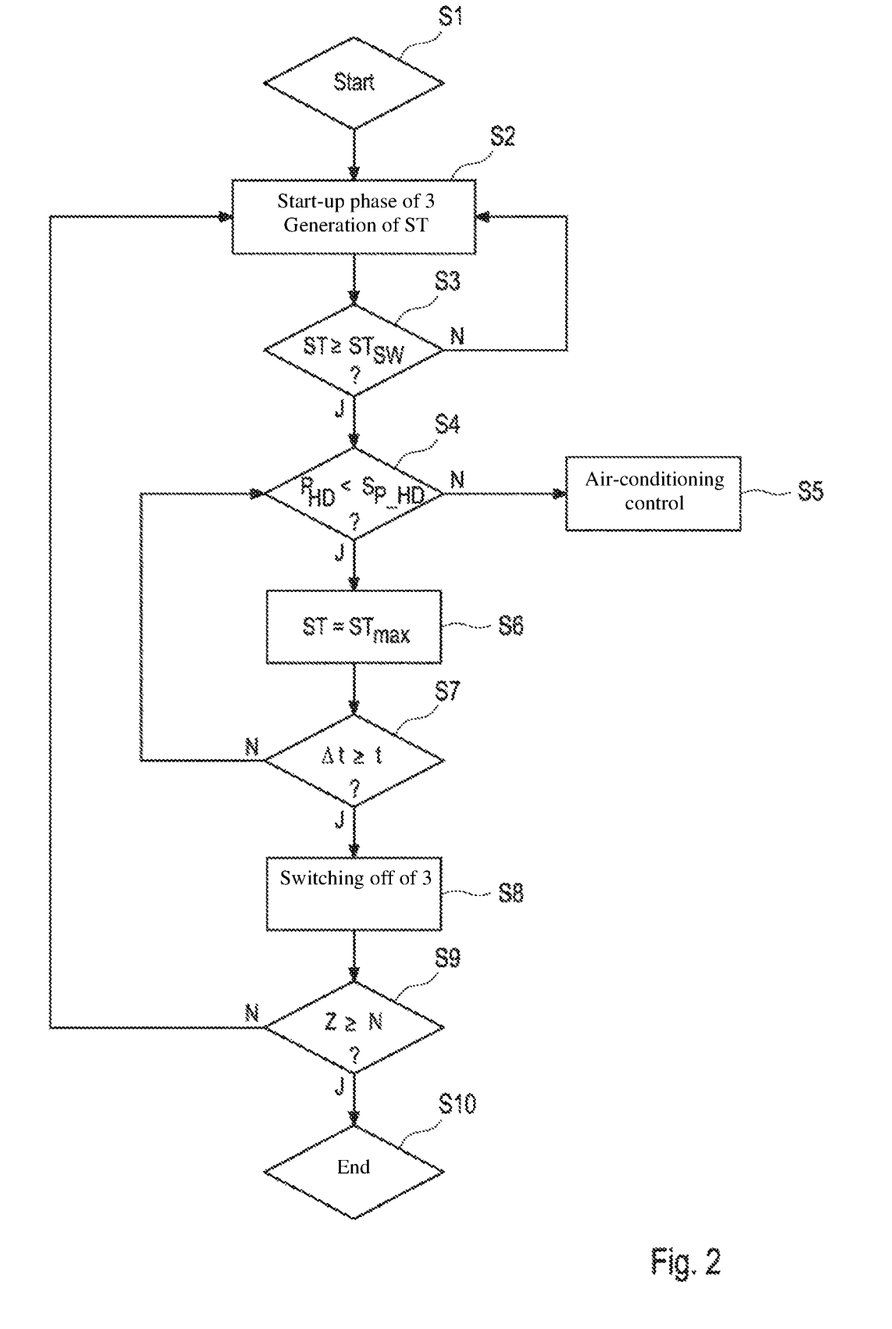
FIG. 2 shows a flow chart for explaining the method according to the invention.

If the control device 6 receives a request for the start-up of the coolant compressor 3, the method according to the invention explained on the basis of FIGS. 2 to 7, for monitoring the start-up behavior of the coolant compressor 3 designed as electrical or mechanical coolant compressor, is carried out with the method step Si according to FIG. 2.

With the start of the method, the start-up phase of the coolant compressor 3 begins, in that an actuation signal ST is generated by the control device 6, which increases over time starting from a minimum value $ST_{min}$ as start value (compare method step S2). The increasing control signal ST is continuously compared, in accordance with the method step S3, with a control signal threshold $ST_{SW}$, in that the condition:

$$ST \geq ST_{SW}$$

is verified. As long as this control signal threshold $ST_{SW}$ is not reached by the actuation signal ST, the actuation signal ST is increased continuously. Otherwise, if the control signal threshold $ST_{SW}$ is reached by the control signal ST, a monitoring of the high pressure $P_{HD}$ of the cooling circuit 1, which is sensed by the pressure-temperature sensor pT1, occurs with following condition (I):

$$P_{HD} < S_{P\_HD}, \qquad (I)$$

wherein $S_{P\_HD}$ is a predetermined defined high-pressure threshold.

If this condition (I) is not reached during the increase of the control signal ST to the point that the control signal threshold $ST_{SW}$ is reached, then the high pressure $P_{HD}$ does not increase, the actuation signal ST is limited to a maximum permissible value, namely the control signal maximum value $ST_{max}$, and the coolant compressor 3 continues to be operated with such an actuation signal $ST=ST_{max}$. If this condition (I) does not change during a subsequent defined duration t, that is to say if the high pressure $P_{HD}$ does not increase beyond the high-pressure threshold $S_{P\_HD}$ (compare method step S7), the coolant compressor 3 is switched off in a subsequent method step S8, i.e., if the high pressure $P_{HD}$ thus does not increase even after the expiration of this defined duration t, this state of the coolant compressor 3 is interpreted as an unsuccessful start or unsuccessful start-up of the coolant compressor 3.

However, if the condition (I) is not satisfied by the reaching of the control signal threshold $ST_{SW}$ or is not satisfied during the duration t, a branching occurs to a method step S5, by means of which the control signal ST is released and an air-conditioning control according to operating procedure is carried out by means of the control device 6.

According to method step S8, the coolant compressor 3 can remain switched off and an error message can be generated or an error flag can be deposited in an error storage of the control device 6.

According to FIG. 2, it is also possible to carry out a restart, in that, by means of a counter Z, the number N of restarts is counted (compare method step S9) and a branching off back to the method step S2 occurs. If the behavior of the coolant compressor, in that an unsuccessful start is identified, is repeated here during the start-up phase thereof, after the reaching of a predetermined number N, the method is terminated with a method step S 10, i.e., the coolant compressor 3 is definitively switched off.

Figure 3:
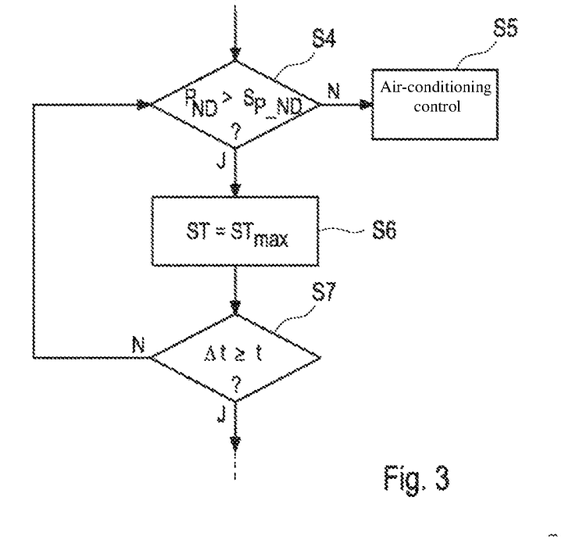
FIG. 3 shows a detail of the flow chart according to FIG. 2 for explaining an alternative embodiment of the method according to the invention.

Instead of the condition (I), the following condition (II) can be used:

$$P_{ND} > S_{P\_ND}. \qquad (II)$$

wherein $S_{P\_ND}$ is a low-pressure threshold which is compared with the low pressure $P_{ND}$ acquired by means of the pressure-temperature sensor pT3. The start-up behavior of the coolant compressor 3 is monitored on the basis of the behavior of the low pressure $P_{ND}$ in the cooling circuit 1. The associated method corresponds to that according to FIG. 2, wherein the method step S4 according to FIG. 2 is replaced by the method step S4 according to FIG. 3.

Figure 4:
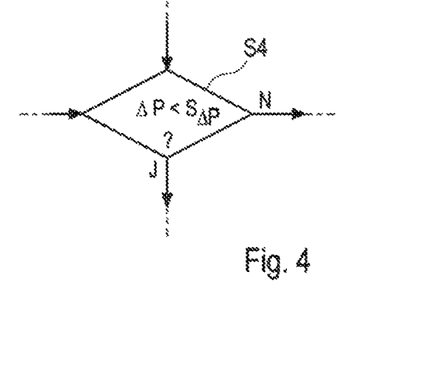
FIG. 4 shows an additional detail of the flow chart according to FIG. 2 for explaining another alternative embodiment of the method according to the invention.

Moreover, it is also possible to monitor not only the high pressure $P_{HD}$ or the low pressure $P_{ND}$ in the cooling circuit 1 during a start-up phase of the coolant compressor 3, but also the difference $\Delta P$ ($=P_{HD}-P_{ND}$) of these two pressures $P_{HD}$ and $P_{ND}$. For this purpose, a differential pressure threshold $S_{\Delta P}$ is generated and compared according to the following condition (III) with the differential pressure $\Delta P$:

$$\Delta P < S_{\Delta P}. \qquad (III)$$

This condition (III) is carried out instead of the condition (I) or (II) for carrying out the method according to FIG. 2, wherein the method step S4 is replaced by the method steps S4 according to FIG. 4.

Finally, it is also possible, in the method steps according to FIG. 2, to verify not only the condition (I), but at the same time also the conditions (II) and (III), and to continue the method with the method step S6 as soon as at least one of these conditions (I) to (III) is satisfied.

If an electrical coolant compressor 3 which is itself designed to be capable of self-diagnosis is used, that is to say comprises diagnosis means, then these means generate at least one diagnosis signal which, for example, indicates the generated torque and/or the power consumption and/or the resulting output as capacity variable. Such a capacity variable L can also be used for monitoring the start-up behavior of the coolant compressor 3.

Figure 5:
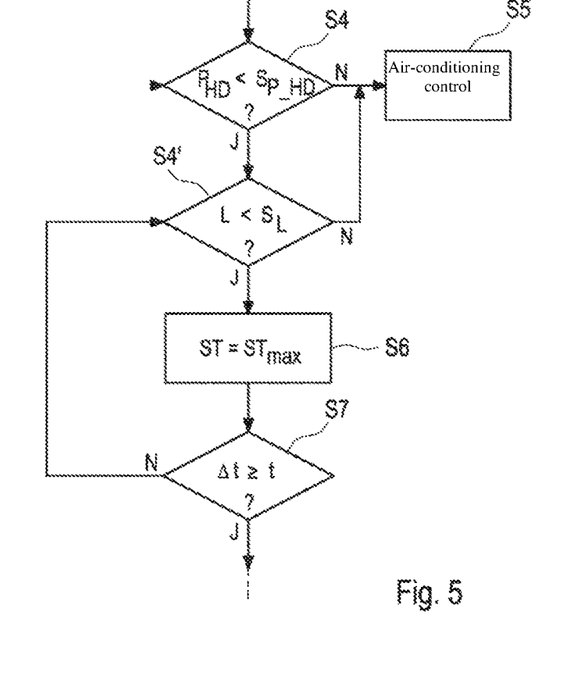
FIG. 5 shows an additional detail of the flow chart according to FIG. 2 for explaining another alternative embodiment of the method according to the invention.

For this purpose, the method step S4 according to FIG. 2 is extended by the method step S4' according to FIG. 5. In such a method as well, the condition (I) is first verified with the method step S4, and if applicable, in the method step S4', the condition $$L<S_L \quad (IV)$$

is verified, wherein L is the capacity variable, that is to say, for example, the torque or power consumption or the resulting output of the coolant compressor 3, and $S_L$ is a capacity threshold. Instead of the condition (I), in order to carry out the method according to FIG. 5, both the condition (II) or the condition (III) and any desired combination of these conditions (I) to (III) can be used.

For all the load points of the cooling circuit 1, a single value for the control signal maximum value $ST_{max}$ can be determined. This means that, in the case of a mechanical coolant compressor 3, as control signal ST, a maximum value for the control current signal is determined, and, in the case of an electrical coolant compressor 3, as control signal ST, a maximum value for the rotational speed signal is determined. If, for all the load cases, a common control signal maximum value $ST_{max}$ is determined, a common control signal threshold $ST_{SW}$ can also be established for all the load cases.

An optimization of the method according to the invention is achieved in that the control signal maximum value $ST_{max}$ is generated as a function of the load applied to the cooling circuit 1, which is dependent on the environmental temperature T_Um. Instead of this environmental temperature, the resting pressure of the coolant can also be used, since it directly depends on or is brought about by the environmental temperature. Its significance increases over the duration of the standstill time of a vehicle or of the resting state of a refrigeration system.

Figure 6:
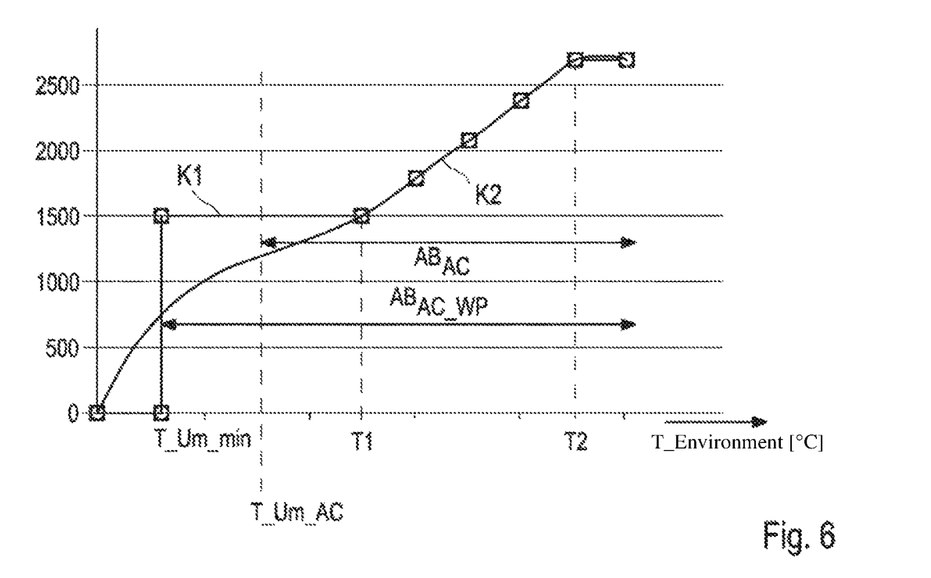
FIG. 6 shows a temperature-rotational speed diagram with characteristic lines for determining a control signal maximum value $ST_{max}$.
Figure 7:
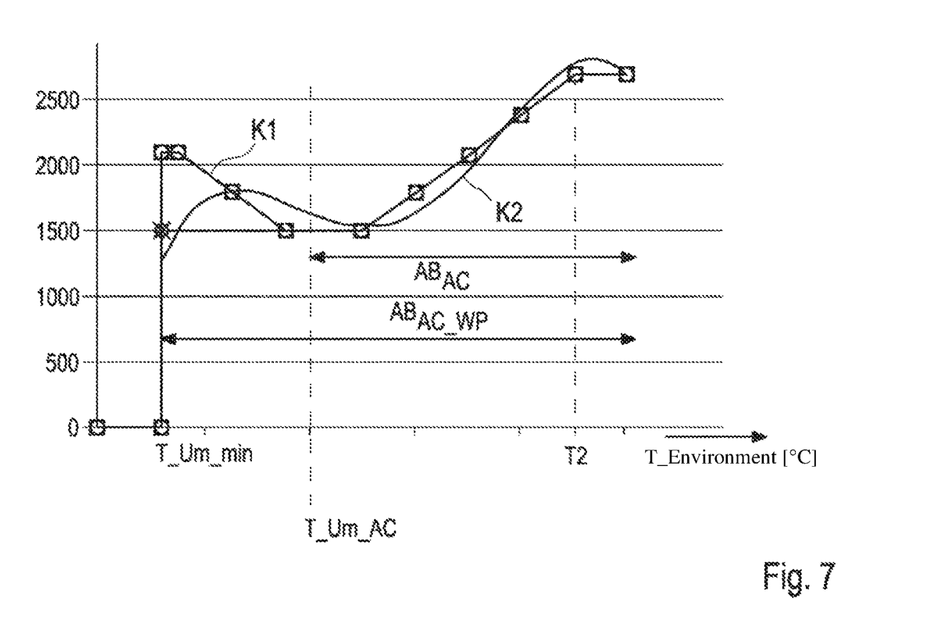
FIG. 7 shows an additional temperature-rotational speed diagram with characteristic lines for determining a control signal maximum value $ST_{max}$.

Thus, FIGS. 6 and 7 each show, as curves K1 and K2, exemplary courses of the control signal maximum value $ST_{max}$, wherein, as control signal ST, a rotational speed signal is generated, and therefore the control signal maximum value $ST_{max}$ is a maximum rotational speed value $n_{max}$. According to these FIGS. 6 and 7, there are two operating ranges $AB_{AC}$ and $AB_{AC\_WP}$ as a function of an environmental temperature interval. The operating range $AB_{AC}$ is used in the refrigeration system operation of the cooling circuit 1 (compare FIG. 1). If this cooling circuit 1 is provided with a heat pump function, the operating range $AB_{AC\_WP}$ is used.

The curves K1 according to FIGS. 6 and 7 each consist of straight curve sections. The course of these curves K1 can be designed to be as complex as desired. For example, the diagrams according to FIGS. 6 and 7 each show a polynomial function as curve K2. In such curves K2 as well, a start-up of the coolant compressor 3, both by means of a control current signal in a mechanical coolant compressor and also by means of a rotational speed signal in an electrical coolant compressor, is carried out.

Below, the use of the curve K1 according to FIG. 6 in the heat pump operation and in the refrigeration system operation in the case of use of an electrical coolant compressor is explained. This also applied to the use of curve K2 according to FIG. 6.

In the heat pump operation of the cooling circuit 1, according to curve K1 of FIG. 6, at a minimum permissible environmental temperature $T_{UM\_min}$ which can be, for example, −20° C., the maximum rotational speed value $n_{max}$ is set to a rotational speed value of 1500 rpm. Subsequently, this maximum rotational speed value remains constant up to an environmental temperature T1.

Subsequently, with increasing load, that is to say with increasing environmental temperature T_Um, the control signal maximum value $ST_{ST}$ increases from 1500 rpm to approximately 2750 rpm, and, starting at a load at an environmental temperature T2 of, for example, 50° C., it is limited to this maximum rotational speed value of 2750 rpm. Since electrical coolant compressors 3 according to the prior art have a minimum rotational speed of, for example, 800 rpm, a linear course up to a rotational speed value zero cannot be achieved. Therefore, for a start-up, an actuation with a minimum rotational speed increased by a certain rotational speed is carried out, in order to be able to overcome the internal resistances in the electrical coolant compressor 3 and to be able to set the associated electric motor in motion.

Usually, in the case of starting, as start pulse, an exaggeratedly high rotational speed of, for example, 1500 rpm, is also necessary in order to be able to achieve a compressor start-up. After a successful compressor start-up, the operating rotational speed itself is then set, which, for example, can be below the start-up rotational speed, such as, for example, a minimum rotational speed of 800 rpm.

If a start-up of the coolant compressor 3 in the AC operation occurs, at an environmental temperature $T_{UM\_AC}$ in accordance with the curve K1 of FIG. 6, the maximum rotational speed value is set to the rotational speed value 1500 rpm. With increasing load, a linear increase occurs starting at the environmental temperature T1, which ends at the environmental temperature T2 with the rotational speed value 2750 rpm.

In the case of a mechanical coolant compressor 3, for the maximum value of the control current signal, as control signal maximum value $ST_{max}$, a course corresponding to the curves K1 and K2 of FIG. 6 results.

At high loads, the control signal maximum value $ST_{max}$ is limited to a maximum value as represented, for example, in FIG. 6 on the basis of the curves K1 and K 2 and in FIG. 7 on the basis of the curve K1. It is also possible to dispense with such a limitation of the control signal maximum value $ST_{max}$ to a maximum value which remains constant, wherein, starting at the environmental temperature T1, a flatter rise is provided, in comparison to Figures K1 and K 2 according to FIG. 6 and to curve K1 according to FIG. 7.

The curves K1 and K2 according to FIG. 7 show a course which differs from that of FIG. 6, in that the values of the control signal maximum value $ST_{max}$ do not increase continuously but instead decrease and subsequently increase again between the starting point $T_{UM\_min}$ and the end point in a short temperature interval.

The course of the n_max curve which in the end is expedient for the applied system load can deviate considerably from the curves K1 and K2 of FIGS. 6 and 7 and has to be newly determined for the respective vehicle air-conditioning system to be applied.

The general start-up behavior of a coolant compressor 3 has no influence on the method according to the invention, since, in each case, the limitation of the control signal ST to the control signal maximum value $ST_{max}$ has to occur.

If, in the end, a successful start-up of the compressor follows, the start-up curves from FIG. 6 and FIG. 7 are left, and, in accordance with the operating strategies of the flow charts of FIGS. 2 to 5, the rotational speed limits are allowed to reach the maximum value.

The invention claimed is:
1. A method for operating a cooling circuit for a vehicle air-conditioning system with
a coolant compressor which can be controlled by means of an actuation signal (ST) for controlling the compressor capacity, a condenser or gas cooler, an evaporator (3) with associated expansion device, and at least one pressure sensor means (pT1, pT3) for measuring the coolant pressure on a high-pressure and/or a low-pressure side of the cooling circuit, comprising:

a) the actuation signal ST of the coolant compressor is provided so as to increase over time from a minimum value ($ST_{min}$) in order to generate a start-up phase of the coolant compressor, b) a control signal maximum value ($ST_{max}$) and a control signal threshold ($ST_{SW}$) are provided, where $ST_{SW} < ST_{max}$, c) after the actuation signal ST of the coolant compressor is provided and after the control signal maximum value and control signal threshold are provided, the actuation signal (ST) is limited to the control signal maximum value ($ST_{max}$) if the actuation signal (ST) reaches the control signal threshold ($ST_{SW}$) and the measured high- and/or low-pressure pressure value ($P_{HD}$, $P_{ND}$) satisfies or satisfy one of the following conditions:

(I) the high-pressure value ($P_{HD}$) is less than a high-pressure threshold ($S_{P\_HD}$), (II) the low-pressure value ($P_{ND}$) is greater than a low-pressure threshold ($S_{P\_ND}$), and/or (III) the difference ($\Delta P$) between high-pressure value ($P_{HD}$) and low-pressure value ($P_{ND}$) is less than a differential pressure threshold ($S_{\Delta P}$), and d) after an expiration of a defined duration (t), the start-up phase of the coolant compressor is terminated if the measured high-pressure value ($P_{HD}$) and/or the measured low-pressure value ($P_{ND}$) still satisfy or satisfies one of the conditions (I) to (III).

2. The method according to claim 1, wherein e) the coolant compressor is designed with diagnosis means by means of which at least one capacity variable (L) of the coolant compressor is generated, and, instead of the method steps c and d, the following method steps are carried out:

c1) the actuation signal (ST) is limited to the control signal maximum value ($ST_{max}$) if the control signal (ST) reaches the control signal threshold ($ST_{SW}$), the capacity variable (L) is less than a defined capacity threshold ($S_L$), and the measured high- and/or low-pressure value ($P_{HD}$, $P_{ND}$) satisfy or satisfies one of the following conditions:

(I) the high-pressure value ($P_{HD}$) is less than a high-pressure threshold ($S_{P\_HD}$), (II) the low-pressure value ($P_{ND}$) is greater than a low-pressure threshold ($S_{P\_NH}$), or (III) the difference ($\Delta P$) between high-pressure value ($P_{HD}$) and low-pressure value ($P_{ND}$) is less than a differential pressure threshold ($S_{\Delta P}$), and d1) after expiration of a defined duration (t), the start-up phase of the coolant compressor is terminated if the measured high-pressure value ($P_{HD}$) and/or the measured low-pressure value ($P_{ND}$) satisfy or satisfies one of the conditions (I) to (III) as before, and the capacity variable (L) is less than the capacity threshold ($S_L$).

3. The method according to claim 2, wherein the diagnosis means are designed to acquire the power consumption and/or the torque and/or the resulting output as capacity variable (L) of the coolant compressor.

4. The method according to claim 1, wherein the control signal maximum value ($ST_{max}$) is determined as a function of the extent of a control deviation between a target value of a control variable controlling the cooling circuit and its actual value.

5. The method according to claim 1, wherein the coolant compressor is an electrical coolant compressor with an electric motor, wherein, as control signal (ST), a rotational speed signal for the electric motor is used.

6. The method according to claim 1, wherein the coolant compressor is a mechanical coolant compressor with a proportional valve, wherein, as actuation signal (ST), a control current signal for the proportional valve is used.

7. The method according to claim 1, wherein the cooling circuit includes a heat pump function.

\* \* \* \* \*